(12) United States Patent
Hogan et al.

(10) Patent No.: US 10,844,558 B2
(45) Date of Patent: Nov. 24, 2020

(54) METHODS AND SYSTEMS FOR OPERATING A MILLING MACHINE

(71) Applicant: CATERPILLAR PAVING PRODUCTS INC., Brooklyn Park, MN (US)

(72) Inventors: Lee M. Hogan, Varna, IL (US); Matthew-David S. Frantz, Shakopee, MN (US); Jason William Muir, Andover, MN (US); Kristen Ann Gerstner, Peoria, IL (US); Timothy Michael O'Donnell, Long Lake, MN (US); Hyppolite Kuissi, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/294,492

(22) Filed: Mar. 6, 2019

(65) Prior Publication Data

US 2019/0203431 A1    Jul. 4, 2019

Related U.S. Application Data

(63) Continuation of application No. 15/691,123, filed on Aug. 30, 2017, now Pat. No. 10,266,996.

(51) Int. Cl.
*E01C 23/088* (2006.01)
*B62D 55/065* (2006.01)
(Continued)

(52) U.S. Cl.
CPC .......... *E01C 23/088* (2013.01); *B62D 55/065* (2013.01); *B62D 55/116* (2013.01); *E01C 23/127* (2013.01); *E21C 25/08* (2013.01)

(58) Field of Classification Search
CPC ... E01C 23/088; E01C 23/127; B62D 55/065; B62D 55/116; E21C 25/08
See application file for complete search history.

(56) References Cited

U.S. PATENT DOCUMENTS 4,041,623 A * 8/1977 Miller .................. E01C 19/008
                                            37/382
5,318,378 A   6/1994 Lent
(Continued)

OTHER PUBLICATIONS

PM620 and PM622 Cold Planers; pub date: Jul. 2016.*
(Continued)

*Primary Examiner* — Jung-Mu T Chuang
(74) *Attorney, Agent, or Firm* — Oblon, McClelland, Maier & Neustadt; Jeff A. Greene (57) ABSTRACT

A method for operating a milling machine is disclosed. The method includes receiving an input identifying a leg of a plurality of legs of the milling machine. Further, the method includes determining a height of the leg based on the receiving of the input identifying the leg. The height of the leg being determined based on position data of the leg. The position data being obtained by a first sensor. Further, the method includes determining, by the controller and based on the determining the height of the leg, that a height of other legs of the plurality of legs is to be adjusted. Thereafter, the method includes adjusting the height of the other legs of the plurality of legs to the height of the leg. The height of the other legs being adjusted based on the determined height of the leg.

18 Claims, 7 Drawing Sheets

(51) Int. Cl.
    *B62D 55/116*    (2006.01)
    *E01C 23/12*    (2006.01)
    *E21C 25/08*    (2006.01)

(56) References Cited

U.S. PATENT DOCUMENTS

| | | | | |
|---|---|---|---|---|
| 6,152,648 | A * | 11/2000 | Gfroerer | E01C 23/088 |
| | | | | 299/1.5 |
| 6,328,387 | B1 * | 12/2001 | Cooper | B28D 1/18 |
| | | | | 299/36.1 |
| 6,546,263 | B1 * | 4/2003 | Petty | H04M 1/72519 |
| | | | | 345/158 |
| 7,360,166 | B1 * | 4/2008 | Krzanowski | G06F 16/9577 |
| | | | | 715/767 |
| 8,316,312 | B2 * | 11/2012 | Kim | G06F 3/0481 |
| | | | | 715/765 |
| 8,798,814 | B1 * | 8/2014 | Spencer, V | G08G 5/0021 |
| | | | | 701/4 |
| 8,874,325 | B2 * | 10/2014 | Killion | E01C 23/088 |
| | | | | 701/50 |
| 9,126,571 | B2 * | 9/2015 | Lemire | A61G 7/005 |
| 9,206,566 | B2 * | 12/2015 | Killion | E01C 23/088 |
| 9,956,842 | B2 * | 5/2018 | Muir | E01C 23/127 |
| 2002/0047301 | A1 | 4/2002 | Davis | |
| 2004/0090470 | A1 * | 5/2004 | Kim | G06F 3/0481 |
| | | | | 715/846 |
| 2007/0280801 | A1 * | 12/2007 | Fishburn | E04D 15/00 |
| | | | | 409/296 |
| 2010/0109422 | A1 | 5/2010 | Busley | |
| 2011/0231996 | A1 * | 9/2011 | Lemire | A61G 7/0524 |
| | | | | 5/613 |
| 2013/0082507 | A1 | 4/2013 | Wachsmann | |
| 2013/0153310 | A1 | 6/2013 | Steffen | |
| 2013/0162003 | A1 * | 6/2013 | Killion | E01C 23/127 |
| | | | | 299/1.5 |
| 2013/0162004 | A1 * | 6/2013 | Killion | E01C 23/088 |
| | | | | 299/1.5 |
| 2013/0166155 | A1 * | 6/2013 | Killion | E01C 23/088 |
| | | | | 701/50 |
| 2014/0149265 | A1 * | 5/2014 | Kundra | H04B 7/022 |
| | | | | 705/28 |
| 2014/0260751 | A1 | 9/2014 | Graham | |
| 2015/0220069 | A1 * | 8/2015 | Linehan | G06Q 30/0641 |
| | | | | 700/276 |
| 2015/0243071 | A1 * | 8/2015 | Jovanovic | G06F 3/04815 |
| | | | | 345/427 |
| 2016/0177522 | A1 | 6/2016 | Nacke | |
| 2017/0073908 | A1 * | 3/2017 | Lee | E01C 23/088 |
| 2017/0100981 | A1 * | 4/2017 | Muir | E01C 23/088 |
| 2017/0259353 | A1 * | 9/2017 | Feucht | B23Q 11/0046 |
| 2017/0362784 | A1 | 12/2017 | Hoffmann | |
| 2018/0338405 | A1 * | 11/2018 | Connell | A01M 7/0082 |
| 2018/0338413 | A1 * | 11/2018 | Connell | A01C 7/203 |

OTHER PUBLICATIONS

A book of "The Essential Guide to User Interface Design" by Galitz; pub date: 2002.*
Joseph Vogele AG—Press Release "New in the VOGELE Special Class: SUPER 1800-3i SprayJet". Ludwigshafen am Rhein / Jan. 2015. https:/lwww.voegele.info/en/news-media/press-releases/artikel.61571.php.

* cited by examiner

METHODS AND SYSTEMS FOR OPERATING A MILLING MACHINE

CROSS REFERENCE TO RELATED APPLICATIONS

The present application is a continuation of U.S. patent application Ser. No. 15/691,123, filed Aug. 30, 2017 now granted as U.S. Pat. No. 10,266,966, the entire contents of which are incorporated herein by reference.

TECHNICAL FIELD

The present disclosure relates to milling machines. More specifically, the present disclosure relates to methods and systems for operating a milling machine.

BACKGROUND

A milling machine, such as a cold planer and rotary mixer, may be configured to remove paved area such as a road. Typically, the milling machine may include a rotor, a plurality of legs and an operator cabin, coupled to a frame of the milling machine. Further, a height of the rotor (with respect to the surface) and a height of the plurality of legs may be adjusted based on an operation of the milling machine. For example, when the milling machine performs a milling operation, the rotor and the plurality of legs are lowered. After the milling operation (i.e., non-milling operation), it may be required to lift the plurality of legs and the rotor to a predetermined height (for example maximum height) and thereby enabling the milling machine to travel from a current location to another location.

Typically, to adjust the height of the plurality of legs of the milling machine, the operator may have to individually select and adjust the height of each leg of the plurality of legs. This may lead to the height of each leg of the plurality of legs being unequal (as the operator individually adjusts the height of each leg). The unequal height of the plurality of the legs may be undesirable (e.g., during operation of the milling machine, as the milling machine travels between different locations, etc.).

U.S. Pat. No. 8,874,325 (hereinafter referred to as '325) discloses a method for leveling of a machine on a surface. The method comprises equalizing the legs of the machine prior to extending or retracting the legs of the machine to raise or lower the machine during non-milling operational status. The method also comprises extending or retracting the legs during milling operations while maintaining the relative lengths of each leg.

SUMMARY

According to an aspect of the present disclosure a method for operating a milling machine is disclosed. The method includes receiving an input identifying a leg of a plurality of legs of the milling machine. Further, the method includes determining a height of the leg based on receiving of the input identifying the leg. The height of the leg being determined based on position data of the leg. The position data being obtained by a first sensor. Further, the method includes determining, by the controller and based on determining the height of the leg, that a height of one or more other legs of the plurality of legs is to be adjusted. Thereafter, the method includes adjusting the height of the one or more other legs of the plurality of legs to the height of the leg. The height of the one or more other legs being adjusted based on the determined height of the leg.

According to an aspect of the present disclosure a milling machine is disclosed. The milling machine includes a frame. A plurality of legs is coupled to the frame. The length of the plurality of legs is adjustable. A first sensor configured to monitor a length of each leg of the plurality of legs. Further, the milling machine includes a controller configured to determine a height of a leg based of the plurality of legs. The height of the leg being determined based on position data of the leg. The position data being obtained by a first sensor. Further, the controller is configured to determine, based on determining the height of the leg, that a height of one or more other legs of the plurality of legs is to be adjusted. Furthermore, the controller is configured to adjust the height of the one or more other legs of the plurality of legs to the height of the leg. The height of the one or more other legs being adjusted based on the determined height of the leg.

According to an aspect of the present disclosure a control system for operating a milling machine. The control system includes a first sensor configured to monitor a length of each leg of a plurality of legs of the milling machine. Further, the control system includes a controller communicably coupled to the first sensor. The controller is configured to determine a height of a leg of the plurality of legs based on receiving of the input identifying the leg. The height of the leg being determined based on a position data of the leg. The position data being obtained by a first sensor. Further, the controller is configured to determine, based on determining the height of the leg, that a height of one or more other legs of the plurality of legs is to be adjusted. Furthermore, the controller is configured to adjust the height of the one or more other legs of the plurality of legs to the height of the leg. The height of the one or more other legs being adjusted based on the determined height of the leg.

DETAILED DESCRIPTION

Figure 1:
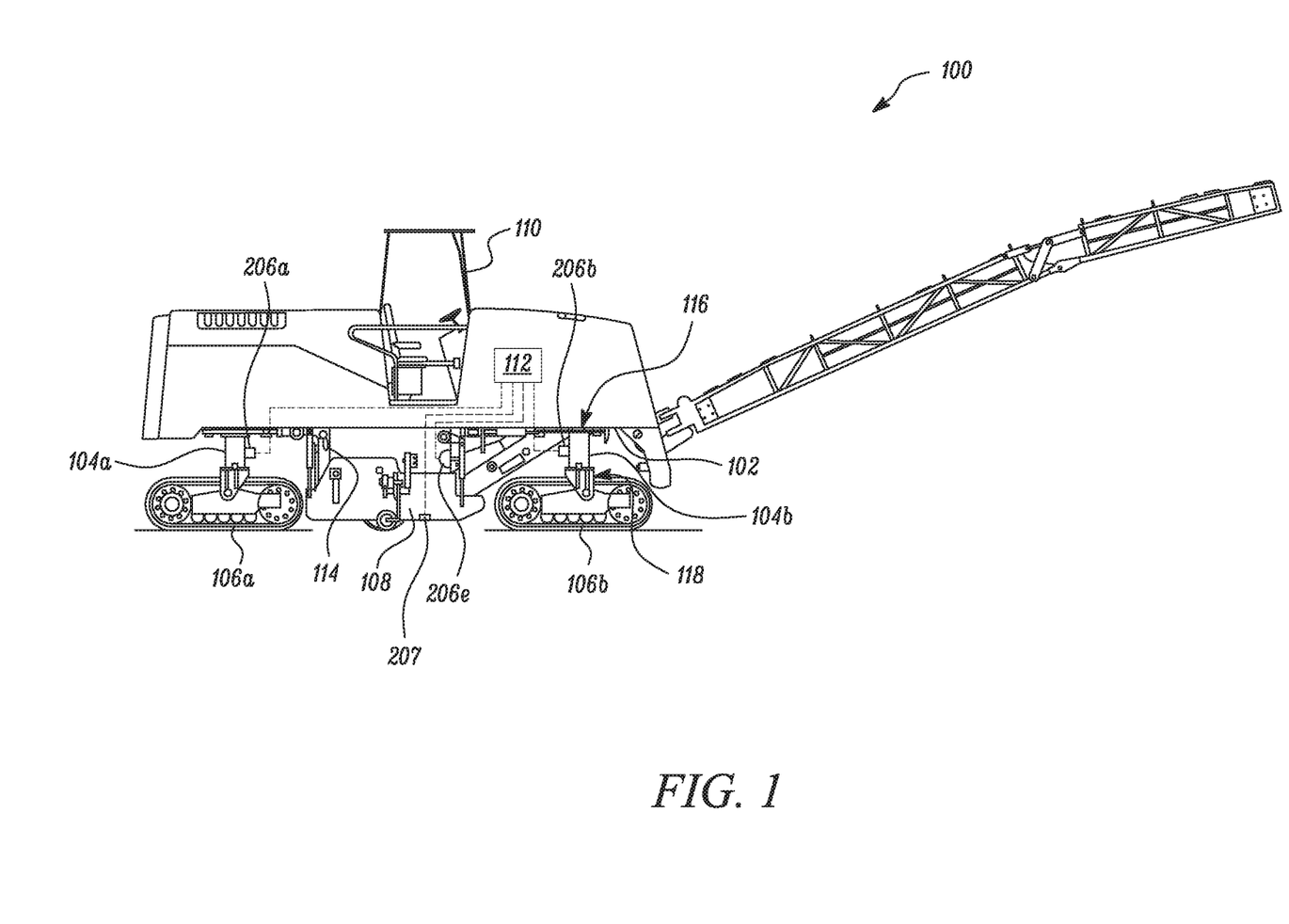
FIG. 1 illustrates a diagrammatic illustration of a side view of a machine, in accordance with some embodiments of the present disclosure.

Referring to FIG. 1, a side view of a machine 100 is illustrated. The machine 100 may include a frame 102, a plurality of legs 104a, 104b, 104c, and 104d (collectively referred to as legs 104), a plurality of ground engaging members 106a, 106b, 106c, and 106d (collectively referred to as ground engaging members 106), a rotor 108, an operator cabin 110, a control system 112, and a hydraulic cylinder 114. The frame 102 may be supported on the plurality of legs 104. In some embodiments, the frame 102 may support the operator cabin 110 and the rotor 108. The rotor 108 may further be suspended from the frame 102 using the hydraulic cylinder 114. In some embodiments, the plurality of legs 104 may be further coupled to the ground engaging members 106. In some embodiments, a height of the machine 100 from a ground surface (on which the machine 100 operates) may be adjustable by adjusting a height of the plurality of legs 104. Further, a height of the rotor 108 may also be adjustable by adjusting a length of the hydraulic cylinder 114 coupled to the rotor 108. The machine 100 is illustrated as a milling machine or a cold planer. However, those skilled in the art would appreciate that the scope of the disclosure is not limited to the machine 100 being the milling machine or the cold planer. In some embodiments, the machine 100 may correspond to any machine that has the capability of adjusting the height of the plurality of legs 104 and the rotor 108, such as a rotary mixer.

Each of the plurality of legs 104 may correspond to a telescopic leg that may be configured to retract or extend to adjust a height of the frame 102 with respect to the ground surface on which the machine 100 operates. In some embodiments, the plurality of legs 104 may be actuated by one or more technologies such as, but are not limited to, hydraulic cylinders and electric motors. In some embodiments, a first end 116 of each leg of the plurality of legs 104 is coupled to the frame 102 and a second end 118 of each leg of the plurality of legs 104 is coupled to a corresponding ground engaging member of the plurality of ground engaging members 106. For example, the first end 116a of the leg 104a is coupled to the frame 102. Further, the second end 118a of the leg 104a is coupled to the ground engaging member 106a. The ground engaging members 106 may correspond to at least one of traction members.

The rotor 108 may correspond to a cutting tool that may be configured to mill the ground surface. As discussed, the rotor 108 may be supported on the frame 102 using the hydraulic cylinder 114. The height of the rotor 108 from the ground surface may be adjusted by actuating the hydraulic cylinder 114. Additionally, or alternately, the height of the rotor 108 may further be adjusted based on adjusting the height of the plurality of legs 104. The adjustment of the height of the rotor by adjusting the height of the plurality of legs 104 will be described below.

As discussed above, the operator cabin 110 may be supported on the frame 102 of the machine 100. In some embodiments, the operator cabin 110 may include one or more control devices/interfaces that may enable an operator of the machine 100 to control various functionalities of the machine 100. For example, the operator cabin 110 may include a touchscreen display device that may display information, via a user interface, to the operator. In some embodiments, the user interface (described below with respect to FIG. 4) may include various icons, control panels, and other graphical and/or textual information that may enable the operator to select and control a particular component of the machine 100. An exemplary user interface will be described later in conjunction with FIG. 4.

The control system 112 may correspond to software and/or hardware that may be configured to control the operation of the machine 100. For example, the control system 112 may be configured to control height of the plurality of legs 104 based on the input received from the operator of the machine 100 via the user interface. It may be contemplated, that the control system 112 may be configured to control various other operations of the machine 100 without departing from the scope of the disclosure. The operation and structure of the control system 112 will be described in conjunction with FIG. 2.

Figure 2:
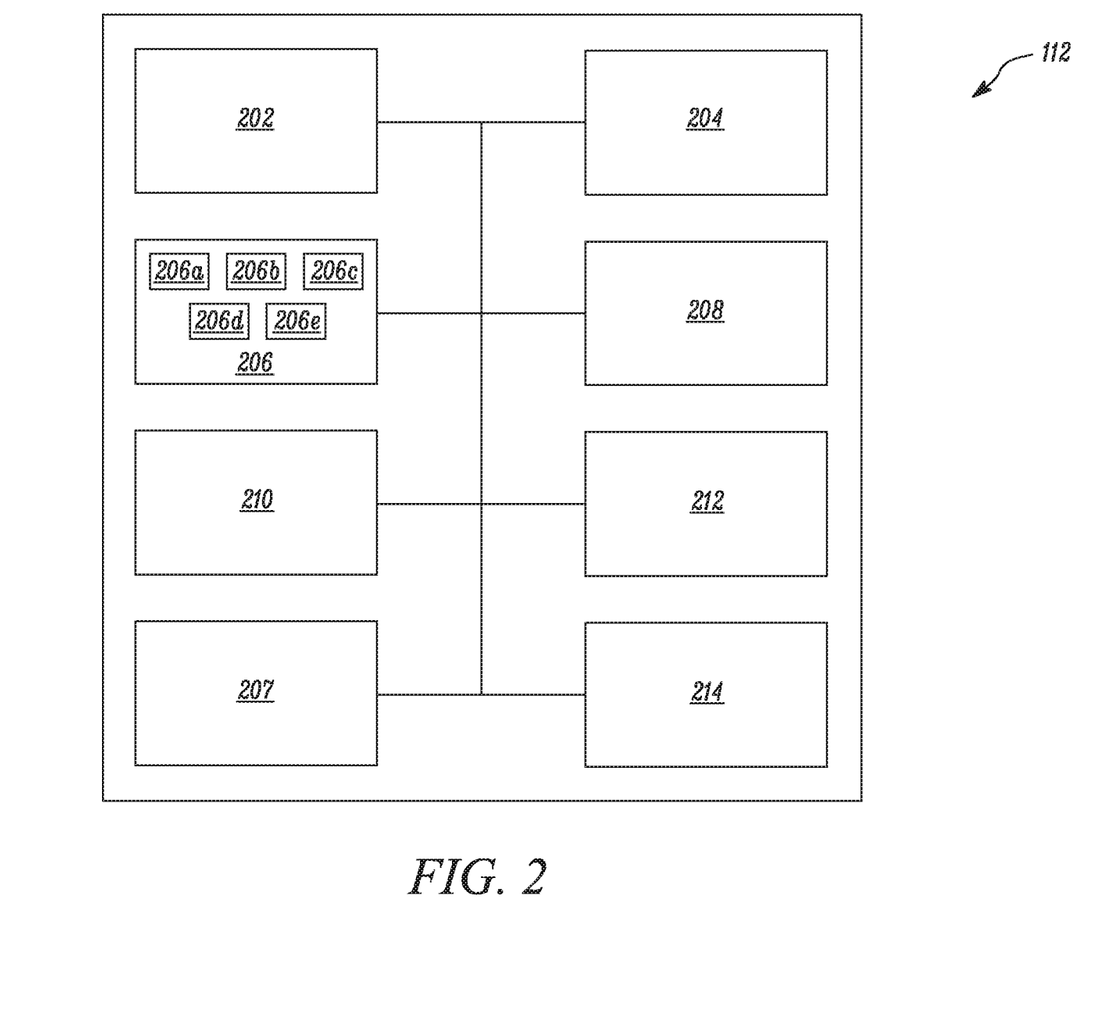
FIG. 2 illustrates a schematic of a control system for operating the machine, in accordance with some embodiments of the present disclosure.

Referring to FIG. 2, a schematic of the control system 112 is illustrated. The control system 112 may include a controller 202, a memory 204, a display unit 210, one or more first sensors 206a, 206b . . . 206d (hereinafter referred to as first sensors 206), an actuation unit 208, a second sensor 212, and a transceiver 214. The controller 202 may be communicatively coupled to each of the memory 204, the display unit 210, the first sensors 206, the actuation unit 208, the second sensor 212, and the transceiver 214, to control and monitor their respective operations.

In some embodiments, the controller 202 may include suitable logic, circuitry, and/or interfaces that are operable to execute one or more instructions stored in the memory 204 to perform predetermined operation. The controller 202 may be implemented using one or more processor technologies. Examples of the controller 202 include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor. The operation of the controller 202 will be described in more detail below.

The memory 204 stores a set of instructions and data that are executable by the controller 202 to perform the predetermined operation such as controlling the height of the plurality of legs 104 and controlling the height of the rotor 108. Some of the memory implementations include, but are not limited to, a random-access memory (RAM), a read only memory (ROM), a hard disk drive (HDD), and a secure digital (SD) card.

The first sensors 206 may correspond to cylinder sensors installed in the plurality of legs 104 and in the hydraulic cylinder 114. In some embodiments, the first sensors 206 may be configured to detect a position of a piston in the hydraulic cylinder 114 and generate position data corresponding to the position. Similarly, the first sensors 206 may be configured to determine a position of each leg of the plurality of legs 104 and generate position data corresponding to the position of each leg. For example, the plurality of legs 104 may have physical markings at predetermined positions. The first sensors 206 are configured to detect such markings to determine the position of the plurality of legs. In an embodiment, to detect the markings, the first sensor 206 may transmit a light signal on the surface of the plurality of legs 104 having the markings. The light gets reflected from the markings and accordingly, the reflected light is detected by first sensors 206 to detect the markings. A person of ordinary skill in the art would appreciate that as the plurality of legs 104 extend or retract, the position of the marking (with respect to a position of the first sensors 206) on the plurality of legs 104 will change. Such a change is detected by the first sensors 206 by detecting the position of the markings. Further, the position of the markings is indicative of the height of the plurality of legs 104. In some embodiments, the detected markings correspond to the position data. The first sensors 206 may be configured to transmit the position data associated with the plurality of legs 104 and the rotor 108, to the controller 202. Some examples of the first sensors 206 may include, but are not limited to, a potentiometer, a laser based height detection sensor, and an ultrasonic based distance detection sensor.

The actuation unit 208 may include suitable logic, circuitry, and/or interfaces configured to adjust the height of the plurality of legs 104 and the hydraulic cylinder 114 (coupled to the rotor 108). The actuation unit 208 may include a fluid pump that is configured to pump the fluid in the hydraulic cylinder 114 and/or the plurality of legs 104 to adjust their respective heights. The actuation unit 208 may be implemented as a hardware switch and/or a software switch that allows the controlling the operation of the fluid pump.

The display unit 210 may be configured to display the user interface to the operator of the machine 100. In some embodiments, the display unit 210 may be a Light Emitting Diode (LED) display, an Edge LED display, a Thin Film Transistor (TFT) display, a Liquid Crystal Display (LCD) display, and/or the like. In some embodiments, the display unit 210 may receive input from the operator. In such an implementation, the display unit 210 includes touch sensitive layer (either capacitive or resistive layer) to receive input from the operator. The user interface will be described below in conjunction with FIG. 4.

The second sensor 212 may include suitable logic, circuitry, and/or interfaces configured to detect one or more orientation parameters associated with the operator cabin 110. In some embodiments, the one or more orientation parameters may include pitch, yaw, and roll of the operator cabin 110. In some embodiments, the one or more orientation parameters may be detected with respect to a lateral axis of the operator cabin 110, a longitudinal axis of the operator cabin 110, and a vertical axis of the operator cabin 110. Some examples of second sensor 212 may include, but are not limited to, a gyroscope sensor, an orientation sensor, and/or the like.

The transceiver 214 may correspond to suitable logic, circuitry, and/or interfaces may be configured to transmit and receive data from one or more other components of the machine 100 (such as the first sensors 206, the second sensor 212, and the actuation unit 208) and/or other machines and remote server. The transceiver 214 may utilize one or more communication protocols to transmit and receive data from the components and one or more computing devices. Examples of such communication protocols may include, but are not limited to, Transport Control Protocol/Internet Protocol (TCP/IP), 3G, 4G, 2G, Bluetooth, Zigbee, Inter-IC (I2C), and/or the like.

In operation, the controller 202 may be configured to operate the machine 100 in a first mode or a second mode. In the first mode, the controller 202 may be configured to operate the machine 100 to perform a milling operation. In some embodiments, the milling operation may involve cutting the ground surface. In the second mode, the controller 202 may be configured to operate the machine 100 to allow the machine 100 to move from one location to another without the milling operation being performed. The functionalities/operations of the controller 202 in both the modes will be described in conjunction with FIG. 3 and FIGS. 5A, 5B, and 5C, respectively.

Figure 3:
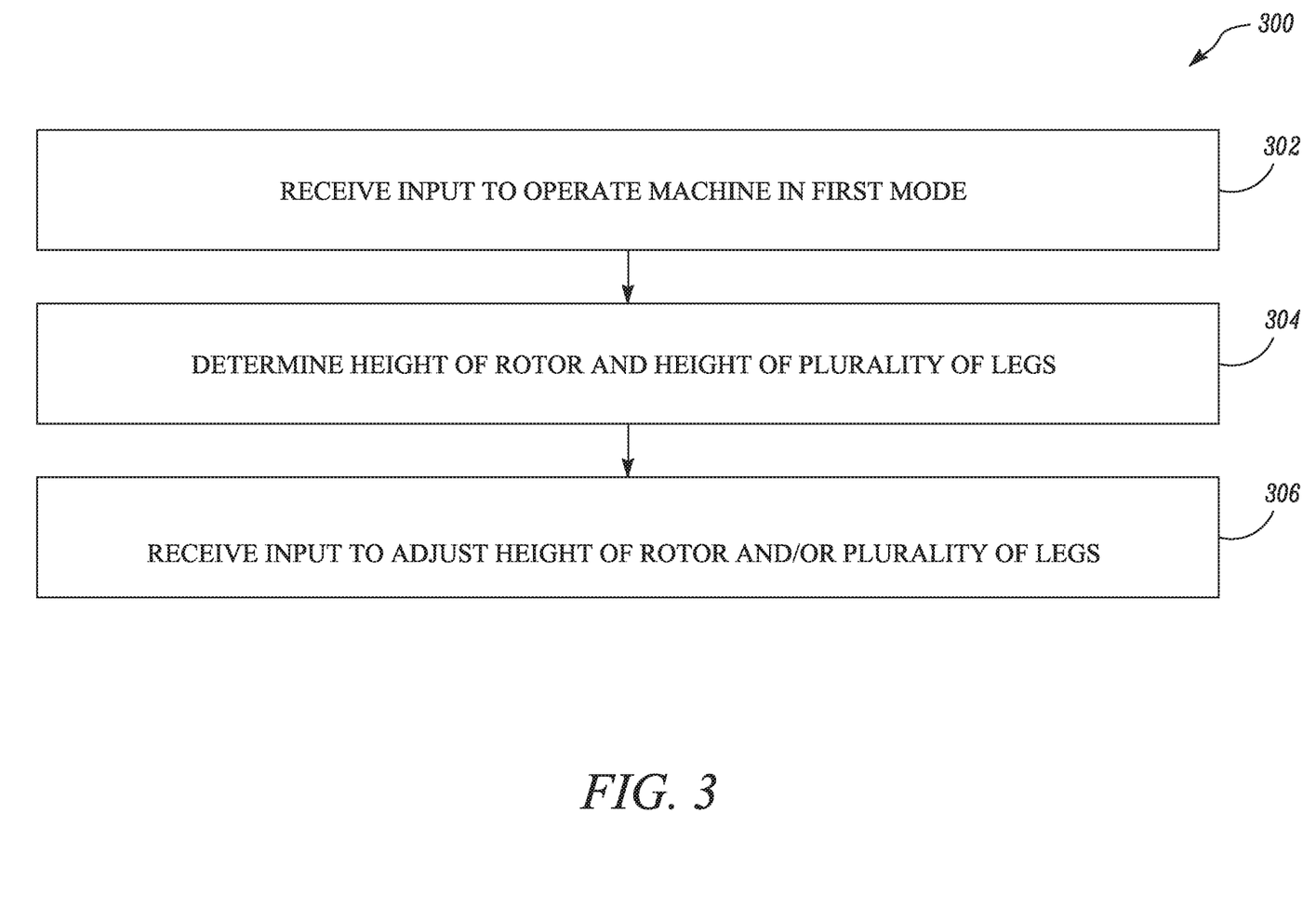
FIG. 3 illustrates a flowchart of a method of operating the machine in a first mode, in accordance with some embodiments of the present disclosure.

Referring to FIG. 3, a flowchart 300 of a method for operating the machine 100 in the first mode, is illustrated. The flowchart 300 is being described in conjunction with FIG. 2.

At step 302, an input is received to operate the machine 100 in the first mode. In some embodiments, the controller 202 may be configured to receive the input from the operator. In some embodiments, for example, the controller 202 may be configured to display a user interface to the operator on the display unit 210. The user interface may present one or more mode options (for example the first mode and the second mode). Thereafter, the operator of the machine 100 may be provided the input to either select the first mode or the second mode. For the purpose of describing FIG. 3, it may be assumed that the operator has selected the first mode (i.e., the milling operation mode).

At step 304, the height of each of the plurality of legs 104 and the height of the rotor 108 from the ground surface, may be determined. In some embodiments, the controller 202 may be configured to determine the height of the plurality of legs 104 and the height of the rotor 108. In some embodiments, the controller 202 may be configured to instruct the first sensors 206 to detect the height of the plurality of legs 104 and the rotor 108. For example, each of the first sensors 206 may detect the height of a respective one of the plurality of legs 104 and the rotor 108. Upon receiving the instruction from the controller 202, the first sensors 206 may be configured to detect a position of the piston of the hydraulic cylinder 114 and the piston of each leg of the plurality of legs 104. Thereafter, the first sensors 206 may be configured to transmit position data (that includes the information regarding the position of the piston in the hydraulic cylinder 114 and the position of each of the plurality of legs 104) to the controller 202. The controller 202 may be configured to determine the height of the plurality of legs 104 and the rotor 108 based on the position data. A person of ordinary skill in the art would understand that the position data associated with the plurality of legs 104 and the rotor 108 may include information pertaining to the length of the plurality of legs 104 and the length of the hydraulic cylinder 114 coupled to the rotor 108. In some embodiments, the length of the plurality of legs 104 is directly proportional to the height of the plurality of legs 104. Similarly, the length of the hydraulic cylinder 114 is directly proportional to the height of the rotor 108 from the ground surface. In some embodiments, the height of the rotor 108 from the ground surface may be controlled by adjusting the height of the plurality of legs 104. For example, of the height of the plurality of legs 108 is lowered, the height of the rotor 108 from the ground surface reduces. Similarly, if the height of the plurality of legs 104 is raised, the height of the rotor 108 from the ground surface also increases.

In some embodiments, the height of the plurality of legs 104 and the rotor 108 may correspond to a percentage value of maximum vertically travel distance associated with each of the plurality of legs 104 and of the hydraulic cylinder 114 coupled to the rotor 108. In some embodiments, the maximum travel distance corresponds to a maximum length to which the plurality of legs 104 and the hydraulic cylinder 114 can be extended. For example, the maximum vertical travel distance associated with each of the plurality of legs 104 is 0.5 meters and the current height of the each of the plurality of legs 104 is 0.125 meters. In such an implementation, the height of the plurality of legs 104 is 25% of the maximum vertical travel distance. Thereafter, the controller 202 may be configured to display the height of the plurality of legs 104 and the rotor 108 on user interface.

At step 306, an input is received to adjust the height of the rotor 108 and/or the height of the plurality of legs 104. In some embodiments, the controller 202 may be configured to receive the input from the operator through the user interface being displayed on the display unit 210. For example, to perform the milling operation, the operator may provide input on the user interface to lower the height of the rotor 108 until the rotor 108 contacts with the ground surface. Thereafter, the controller 202 may operate the rotor 108 to mill the ground surface.

In some embodiments, the operator may provide input to lower the height of the rotor 108 to a minimum height from the ground surface by providing an input to extend the hydraulic cylinder 114 to the maximum vertical position. In certain scenarios, the rotor 108 does not contact the ground surface despite a full extension of the hydraulic cylinder 114.

In such an implementation, the operator may further provide input (on the user interface) to adjust the height of the plurality of legs 104 until the rotor 108 contacts the ground surface. For example, on lowering the height of the rotor 108 to the maximum limit, the controller 202 may determine that the rotor 108 is at a particular distance from the ground surface (0.1 meter). In such an implementation, the controller 202 may display a notification, indicative of an information pertaining to the particular distance of the rotor 108 from the ground surface, on the user interface. Accordingly, the operator, based on the information pertaining to the particular distance of the rotor 108—from the ground surface, may provide the input to lower the height of the plurality of legs 104 by the particular distance (e.g., 0.1 meter) to allow the rotor 108 to contact the ground surface.

In some embodiment, the lowering of the height of the plurality of legs 104 to in turn lower the rotor 108 may be performed automatically without operator's intervention. In such a scenario, the controller 202 may determine that the hydraulic cylinder 114 has extended to the maximum limit and that the rotor 108 is not in contact with the ground surface. In some embodiments, the controller 202 may utilize one or more third sensors 207, and installed on the rotor 108 and first sensors 206 installed on the hydraulic cylinder 114 to determine whether the rotor 108 is in contact with the ground surface. A person of ordinary skill in the art would appreciate that the scope of the disclosure is not limited placing the one or more third sensors 207 on the rotor 108. In an embodiment, the one or more third sensors 207 may be placed in such a location from where the distance of the rotor 108 from the ground surface may be determined. In some embodiment, the one or more third sensors 207 may correspond to ultrasonic sensors or laser based distance determining sensors that are capable of determining distance between two points. In such an implementation, the one or more third sensors 207 determine the distance between the rotor 108 and the ground surface. After determining the distance between the rotor 108 and the ground surface, the one or more third sensors 207 will transmit information regarding the distance and the controller 202 may automatically actuate the plurality of legs 104 to lower the height of the plurality of legs 104 by the distance determined by the one or more third sensors 207.

In some embodiments, the operator may further provide input on the user interface to adjust height of the rotor 108 and/or the height of the plurality of legs 104 to adjust the depth of the cut to a desired depth. For example, assume that the rotor 108 is fully extended and that the operator wishes that depth of the cut be a particular depth (e.g., 0.25 meter). The operator may in such an implementation provide an input to lower the height of the plurality of legs 104 by a particular distance (e.g., 0.25 meter) to obtain a cut in the surface having the particular depth (e.g., 0.25 meter). In some embodiments, the operator may provide an input pertaining to depth of the cut, rather than providing input to adjust the height of the plurality of legs 104. In such instance, the controller 202 may determine a height, of the plurality of legs 104, corresponding to the depth of the cut and actuate the plurality of legs 104 to adjust the height of the plurality of legs 104 to the height corresponding to the depth of the cut.

In some embodiments, to assist the operator to operate the machine 100 in the first mode, the controller 202 may be configured to display on the user interface a range in which the height of the plurality of legs 104 and the rotor 108 should be operated for the machine 100 to perform the milling operation. In some embodiments, information identifying the range of the height for the plurality of legs 104 and the rotor 108 may be stored in the memory 204. Further, the controller 202 may be configured to cause the user interface to display the range of the height for the plurality of legs 104 and the rotor 108 on the user interface. The user interface will be described in conjunction with FIG. 4.

Figure 4:
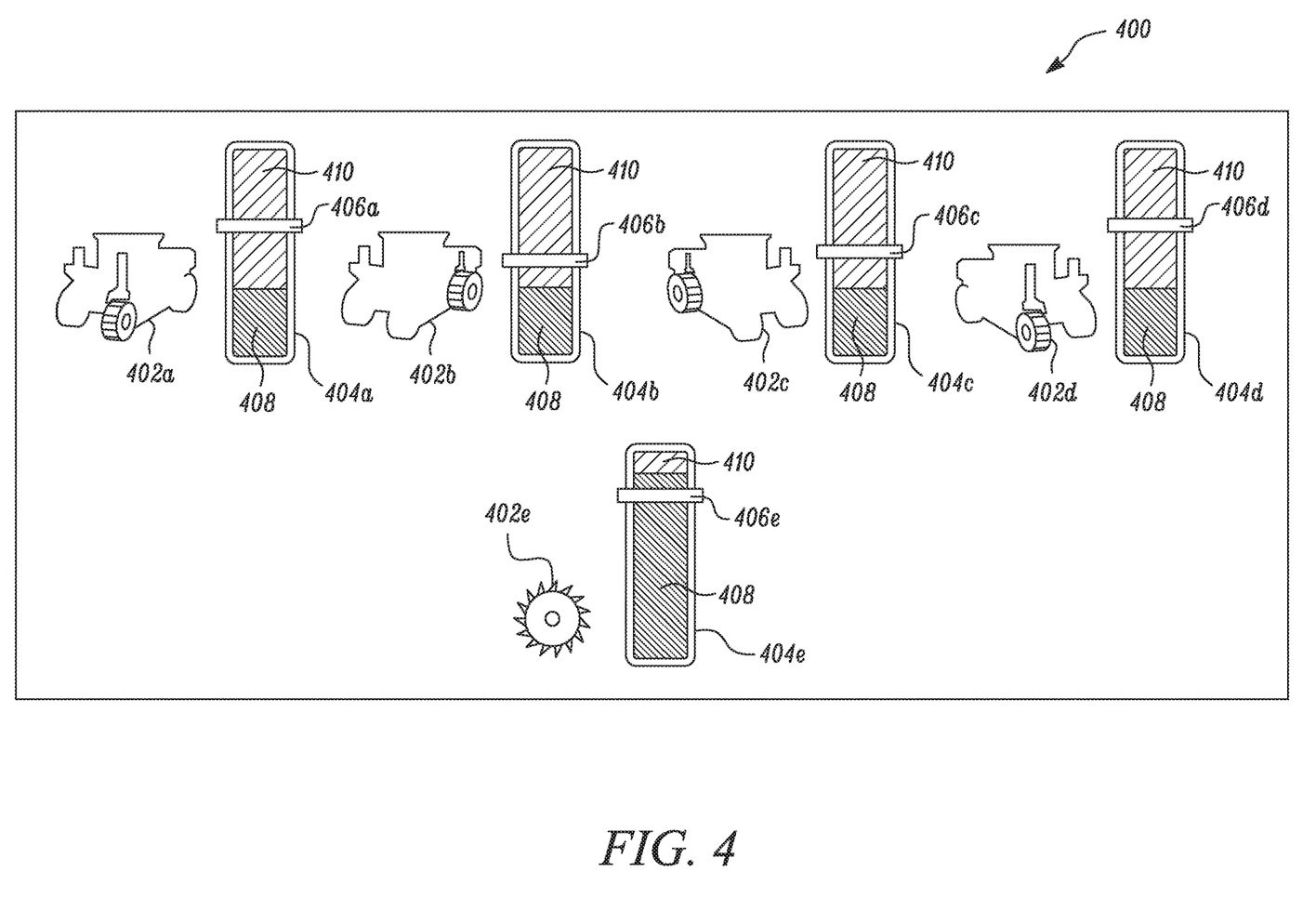
FIG. 4 illustrates an exemplary user interface, in accordance with some embodiments of the present disclosure.

Referring to FIG. 4 the user interface 400, is illustrated. The user interface 400 will be explained in conjunction with FIG. 3.

The user interface 400 displays a plurality of icons 402a, 402b, 402c, 402d, and 402e identifying the plurality of legs 104 and the rotor 108, respectively. For example, the icon 402a identifies the leg 104a, the icon 402b identifies the leg 104b, the icon 402c identifies the leg 104c, the icon 402d identifies the leg 104d, the icon 402e identifies the rotor 108. Additionally, each icon of the plurality of icons has an associated graphical element (e.g., a track bar such as the track bar 404a associated with the icon 402a). In some embodiments, the track bar 404a identifies a range of height (or distance) that a leg/rotor 108 can travel. The range of the height may be adjusted between a maximum vertical position and a minimum vertical position associated with the leg. In some embodiment, the maximum vertical position corresponds to a position at which the plurality of legs 104 are fully extended. The length of the plurality of legs 104 when the plurality of legs 104 are fully extended has been referred to the maximum vertical distance. Similarly, the minimum vertical position corresponds to a position at which the plurality of legs 104 are fully retracted. The length of the plurality of legs 104 when the plurality of legs 104 are fully retracted has been referred to the minimum vertical distance.

In some embodiments, the range of the height associated with the plurality of legs 104 and the rotor 108 is divided into multiple ranges of height (e.g., a first range of height and a second range of height). In some embodiments, when the height of the plurality of legs 104 and the rotor 108 is within the first range of height, the machine 100 may operate in the first mode. In some embodiments, when the height of the plurality of legs 104 and the rotor 108 is within the second range of height, the machine 100 may operate in the second mode. In certain implementation, the first range of height and the second range of height may be presented on the user interface 400 in a first graphical scheme 408 (e.g., a first color) and a second graphical scheme 410 (e.g., a second color), respectively, to enable the operator to differentiate between the two ranges of height (i.e., the first range of height and the second range of height).

To adjust the height of the plurality of legs 104 and the rotor 108 from the user interface 400, another graphical element (e.g., a seek bar such as seek bar 406a) is positioned in each track bar 404. The seek bar 406a is movable on the track bar 404a. In some embodiments, the position of the seek bar 406a on the track bar 404a may identify a current height of a leg or the rotor 108. For example, a position of the seek bar 406a is at 25% mark, which identifies that the height of the leg 104a is 25% of the maximum vertical travel distance associated with the leg 104a. Further, to adjust the height of the plurality of legs 104 and rotor 108, the operator may move the seek bar 406a on the track bar 404a. For example, the operator may move the seek bar 406a at a 50% mark on the track bar 404a. On receiving such an input, the controller 202 may actuate the leg 104a associated with the seek bar 406a and the track bar 404a to extend until the height of the leg 104a is 50% of the maximum vertical travel distance associated with the leg 104a.

As discussed above that the track bar 404 is presented in two graphical schemes (e.g., first color and second color) to identify the first range of height and the second range of height. The operator may provide the input to move the seek bar 406 within the first range of height (identified in the first graphical scheme 408) or within the second range of height (identified in the second graphical scheme 410) depending on the type of operation that the operator wishes for the machine 100 to perform. For example, when the machine 100 is to be operated in the milling mode (i.e., first mode) the operator may adjust the height of the plurality of legs 104 and the rotor 108 within the first range of height, which is depicted by the first graphical scheme 408 on the user interface. Similarly, when the machine 100 is to be operated in the non-milling mode (i.e., the second mode), the operator may provide input to adjust the height of the plurality of legs 104 and the rotor 108 to be within the second range of height (i.e., the seek bar on the track bar will in the second graphical scheme 410). A person of ordinary skill in the art would appreciated that the scope of the disclosure is not limited to operator manually providing input to move the seek bar. In an embodiment, the operator may provide input to select the mode (i.e., milling mode or non-milling mode), and accordingly, the controller 202 may automatically move the seek bar in the first range of height or the second range of height. Similarly, the controller 202 may automatically adjust the height of the rotor 108 based on the mode selected by the operator. The operation of the machine 100 in the second mode (non-milling operation mode) will be described in conjunction with FIGS. 5A, 5B, and 5C.

Figure 5A:
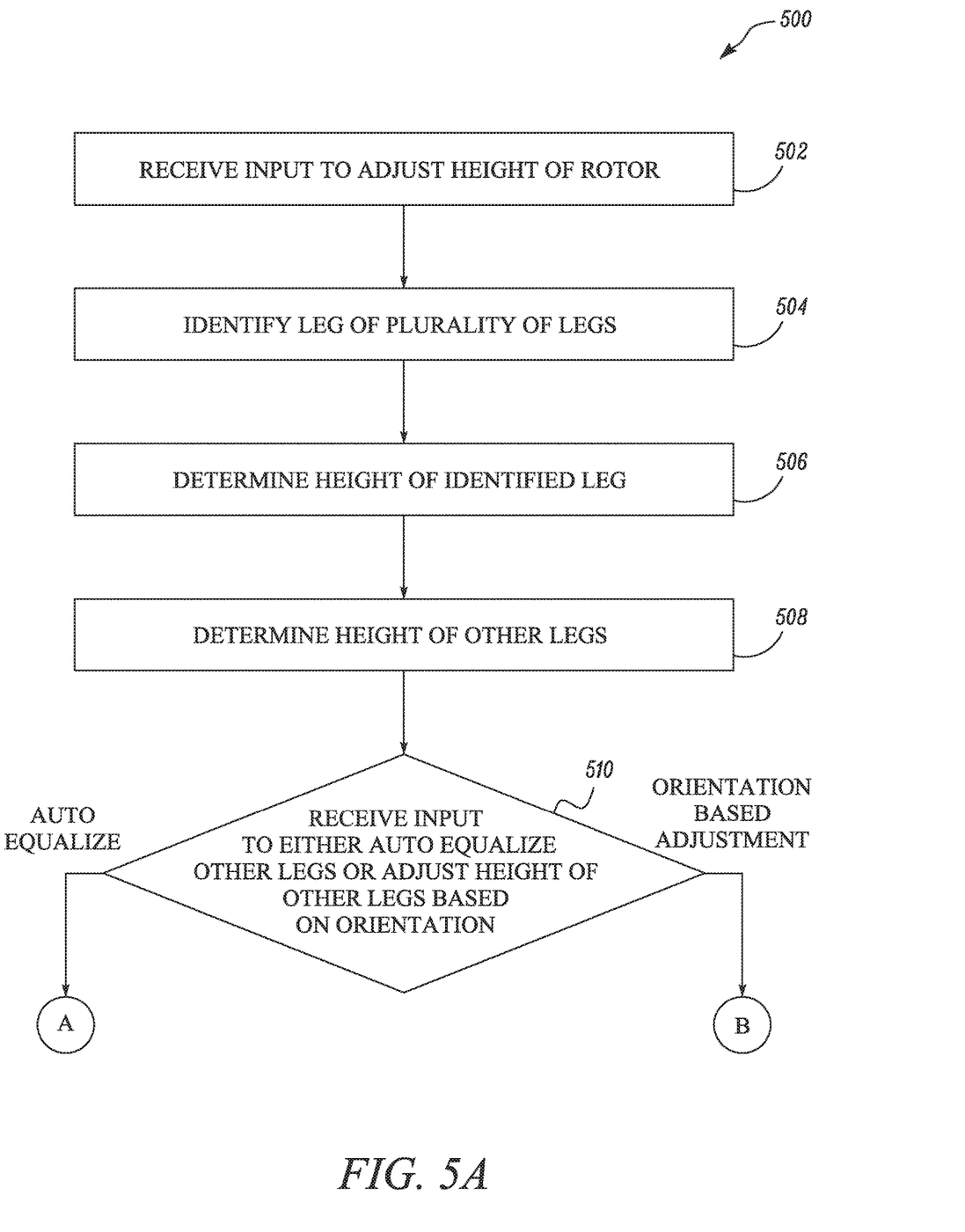
FIGS. 5A, 5B, and 5C illustrate a flowchart of a method of operating the machine in a second mode, in accordance with some embodiments of the present disclosure.
Figure 5B:
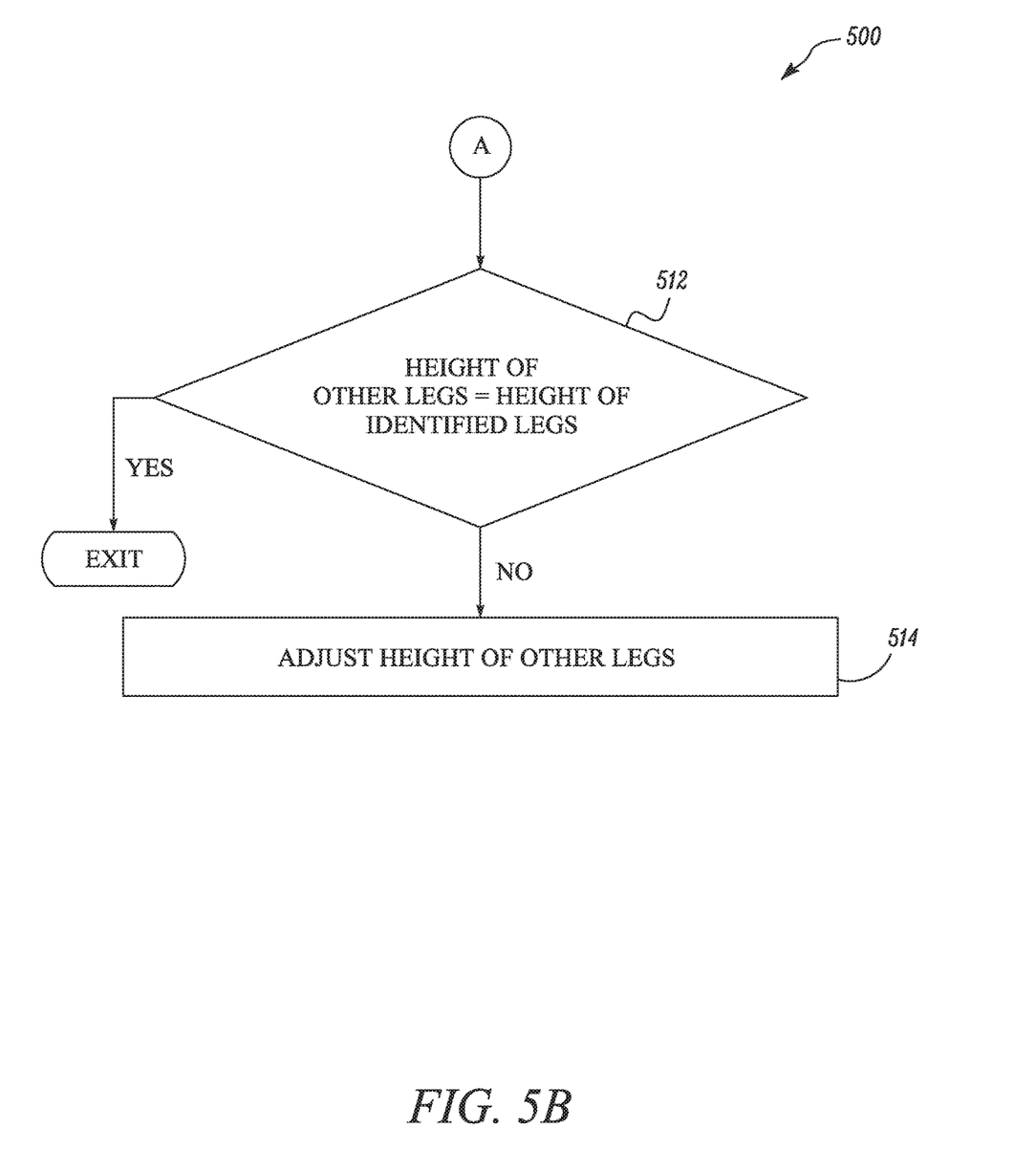
Figure 5C:
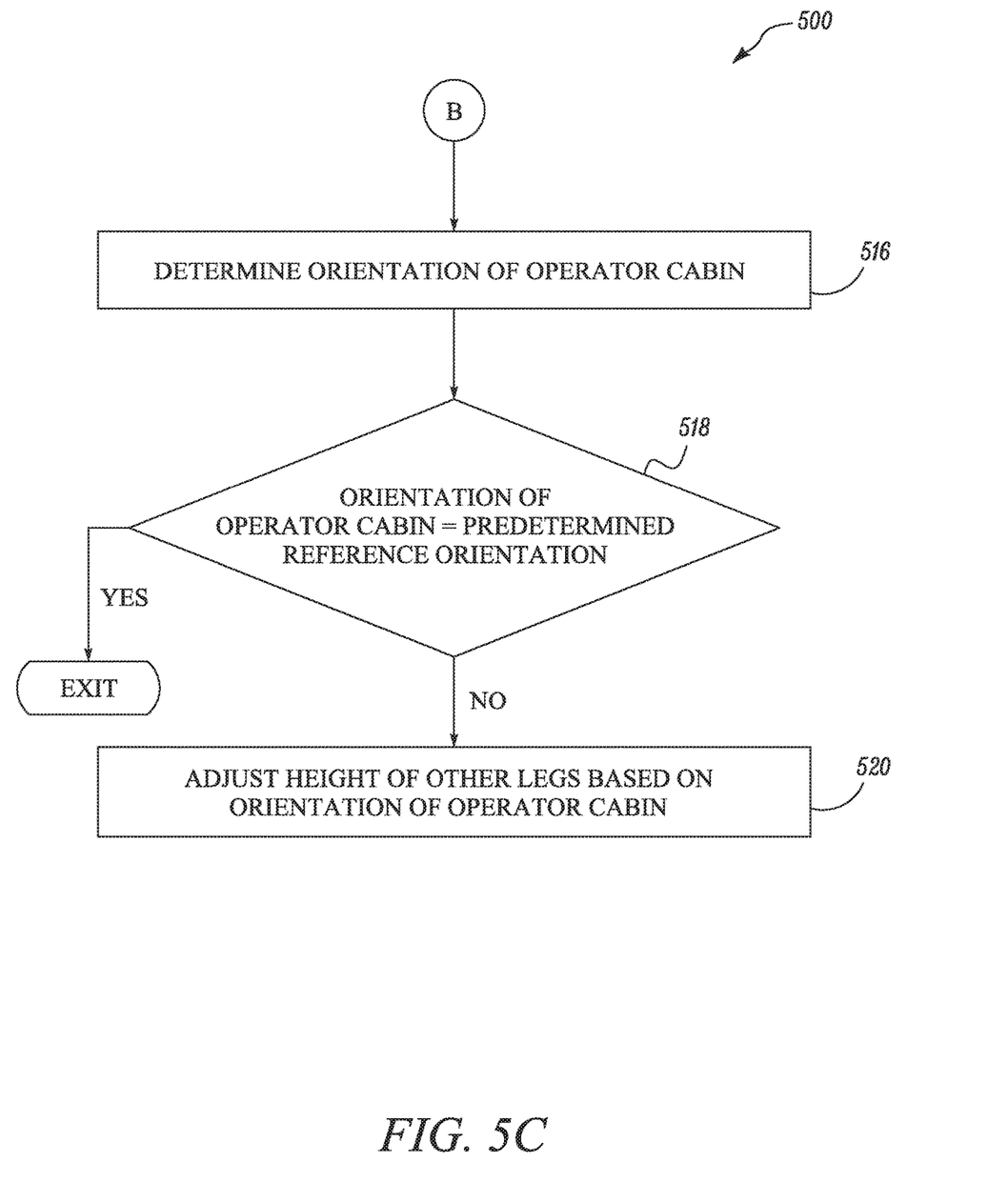

FIGS. 5A, 5B, and 5C illustrate a flowchart 500 of a method to operate the machine 100 in the second mode. The flowchart 500 will be described in conjunction with FIG. 2, and FIG. 4.

At step 502, an input is received to adjust the height of the rotor 108. In certain implementation, the controller 202 may be configured to receive the input from the operator of the machine 100 to adjust the height of the rotor 108. As the operator wishes to operate the machine 100 in the second mode, the operator may provide the input to adjust the height of the rotor 108 to the second range of height. In certain implementation, the operator may provide input to move the seek bar 406e on the track bar 404e to a portion on the track bar 406e identified by the second graphical scheme 410 (identifying the second range of height).

A person of ordinary skill in the art would appreciate that the operator 202 may provide the input to adjust the height of the rotor 108 to the second range of height, if initially the height of the rotor 108 is in the first range of height. Alternatively, if, initially, the height of the rotor 108 is in the second range of the height, the operator may not provide such an input.

In some embodiments, the operator may provide input to operate the machine 100 in the second mode by selecting an option to operate in the second mode, from the one or more mode options initially displayed on the user interface 400. In such an implementation, the controller 202 may automatically adjust the height of the rotor 108 to the second range of height.

At step 504, an input identifying a leg of the plurality of legs 104 is received. In some embodiments, the controller 202 may be configured to receive the input identifying the leg. As discussed in conjunction with FIG. 4, a plurality of icons 402 is displayed on the display unit 210. The operator may provide an input to select an icon (identifying the leg) from the plurality of icons 402.

At step 506, a height of the identified leg is determined. In certain implementation, the controller 202 may be configured to determine the height of the identified leg in a similar manner as discussed in the step 304. Further, the controller 202 may be configured to store information identifying the determined height of the identified leg in the memory 204.

At step 508, a height of one or more other legs of the plurality of legs 104 is determined. In some embodiments, the controller 202 may be configured to determine the height of the one or more other legs of the plurality of legs 104 in a similar manner as discussed in the step 304. Further, the controller 202 may be configured to store information identifying the determined height of the one or more other legs in the memory 204.

At step 510, an input is received from an operator to either auto-equalize the one or more other legs of the plurality of legs 104 or to adjust the height of the one or more other legs based on orientation of the operator cabin 110. In certain implementation, the controller 202 may be configured to receive the input. Prior to receiving the input from the operator, the controller 202 may be configured to display the option on the user interface to either auto-equalize the one or more other legs of the plurality of legs 104 or to adjust the height of the one or more other legs based on orientation of the operator cabin 110. Thereafter, the operator may provide the input on the user interface 400. If the operator selects the option to auto-equalize the one or more other legs of the plurality of legs 104, step 512 is performed.

A person of ordinary skill in the art would appreciate that the scope of the disclosure is not limited to the operator providing input to auto-equalize the plurality of legs 104. In some embodiments, the controller 202 may automatically adjust the height of the one or more other legs upon receiving input from the operator to identify the leg (step 504).

At step 512, a check is performed to determine whether the height of the identified leg of the plurality of legs 104 is different than the height of each of the one or more other legs of the plurality of legs 104. In some embodiments, the controller 202 may be configured to perform the check. In some embodiments, the controller 202 may be configured to compare the height of each of the one or more other legs with the height of the identified leg. To perform the comparison, the controller 202 is configured to retrieve the height of the identified leg and the one or more other legs (determined at the step 506 and the step 508) from the memory 204. Thereafter, the controller 202 compares the height of the identified leg with each of the one or more other legs. For example, assume that the identified leg is leg 104a and the height determined at the step 506 is 1 meter. Further, assume that the height determined for the one or more other legs (i.e., leg 104b, 104c, and 104d) is 0.6 meters, 1 meter, and 1.5 meters, respectively. The controller 202 may first compare the height of the leg 104a with the leg 104b to determine that the height of the leg 104b is 0.4 meters less than the height of the leg 104a. Similarly, the controller 202 may determine that the height of the leg 104c is same as the height of the leg 104a, and the height of the leg 104d is 0.5 meters more than the height of the leg 104a.

If the controller 202 determines that the height of the identified leg is different than the height of at least one leg of the one or more other legs, the controller 202 may be configured to perform the step 514.

At step 514, the height of the one or more other legs is adjusted. In some embodiments, the controller 202 may be configured to adjust the height of the one or more other legs. To adjust the height of the one or more other legs, the controller 202 may determine whether the height of the one or more other legs is greater or less than the height of the identified leg (determined in the step 512). Accordingly, the controller 202 may be configured to instruct the actuation unit 208 to adjust the height of the one or more other legs. When the height of the one or more other legs is greater than the height of the identified leg, the controller 202 may be configured to lower the height of the one or more other legs. On the other hand, when the height of the one or more other legs is less than the height of the identified leg, the controller 202 may be configured to raise/increase the height of the one or more other legs. In some embodiments, the height of the one or more other legs are adjusted until the height of the one or more other legs is same as the height of the identified leg.

A person of ordinary skill in the art would appreciate that in some embodiments, there may exist a first leg in the one or more other legs that has a height more than the height of the identified leg. Similarly, second leg in the one or more other legs may have height less than the height of the identified leg. In such an implementation, the height of the first leg is decreased, while the height of the second leg is increased until the height of the first leg and the second leg is same as the height of the identified leg. For example, as discussed in the step 512, the height of the leg 104b is 0.4 meters less than the height of the identified leg 104a. Therefore, the controller 202 may be configured to raise the height of the leg 104b by 0.4 meter. Similarly, as discussed in the step 512, the height of the leg 104d is 0.5 meters more than the height of the identified leg 104a. Therefore, the controller 202 may be configured to lower the height of the leg 104d by 0.5 meter.

Referring back to step 510, if the controller 202 receives the input, from the operator, pertaining to adjusting the height of the plurality of legs 104 based on the orientation of the operator cabin 110, step 516 is performed.

At step 516, the orientation of the operator cabin 110 is determined. In some embodiments, the controller 202 may be configured to determine the orientation of the operator cabin 110. In certain implementation, the orientation of the operator cabin 110 may include at least one of the pitch of the operator cabin 110, the yaw of the operator cabin 110, and the roll of the operator cabin 110. For example, the pitch of the operator cabin 110 is determined with respect to a lateral axis extending along a width of the of the operator cabin 110.

The controller 202 may be configured to instruct the second sensor 212 to determine the orientation of the operator cabin 110. Thereafter, the second sensor 212 may detect and transmit the orientation information to the controller 202.

At step 518, a check is performed to determine whether the orientation of the operator cabin 110 has deviated from a reference orientation. In some embodiments, the controller 202 may be configured to perform the check. In some embodiments, the reference orientation may correspond to a default orientation of the operator cabin 110. In alternate embodiment, the reference orientation may correspond to a previously used orientation, a user inputted orientation, etc. The default orientation of the operator cabin 110 may be stored in the memory 204. For example, the default orientation of the operator cabin 110 may correspond to 0 degree pitch (with reference to the lateral axis of the operator cabin 110), 0 degree yaw (with reference to a longitudinal axis of the operator cabin 110), and 0 degree roll (with reference to a vertical axis of the operator cabin 110). A person of ordinary skill in the art would appreciate that the vertical axis may correspond to an axis that is perpendicular to the lateral axis and the longitudinal axis.

If the controller 202 determines that the orientation of the operator cabin 110 has deviated from the reference orientation, the controller 202 may be configured to perform the step 520.

At step 520, the height of the plurality of legs 104 is adjusted based on the height of the identified leg, height of the one or more other legs, and the orientation of the operator cabin 110. In some embodiments, the controller 202 may be configured to adjust the height of the plurality of legs 104. In some embodiments, the controller 202 may adjust the height of the plurality of legs 104 until the orientation of the operator cabin 110 is equal to the reference orientation.

For example, during the operation of the machine 100 in the first mode, the machine may mill the ground surface or the paved road. In some embodiments after the milling operation has been performed, the rear legs of the plurality of legs 104 may be at a lower elevation in comparison to the front legs of the plurality of legs 104. In some embodiments, this may cause a pitch of the operator cabin 110 to change (e.g., a pitch that is different than 0 (zero) degree). Therefore, the controller 202 may adjust the height of the plurality of legs 104 (during the operation of the machine 100 in the second mode) such that the pitch of the operator cabin 110 becomes zero degree. For instance, the height of the pair of front legs is increased to match the height of the pair of rear legs.

A person of ordinary skill in the art would appreciate that the scope of the disclosure is not limited to adjusting the height of the rotor 108 and the plurality of legs 104 based on the input from the operator (either to adjust the height of the plurality of legs 104 or the height of the rotor 108). In some embodiments, the controller 202 may automatically detect whether the machine 100 is performing the milling operation. For example, the controller 202 may be configured to detect a force acting on the rotor 108 to determine whether the machine 100 is performing the milling operation. For example, when the milling operation is being performed by the machine 100, the rotor 108 may experience a frictional force during the milling operation. Further, when machine 100 does not perform the milling operation, no frictional force acts on the rotor 108. The controller 202 may be configured to measure such forces acting on the rotor 108. If the force acting on the rotor 108 is less than a predetermined value, the controller 202 may determine that the machine 102 is not performing the milling operation. Accordingly, the controller 202 may be configured to adjust the height of the rotor 108 and the plurality of legs 104 to the second range of height. Further, if the force acting on the rotor 108 is more than a predetermined value, the controller 202 may determine that the machine 102 is performing the milling operation. Accordingly, the controller 202 may be configured to adjust the height of the rotor 108 and the plurality of legs 104 to the first range of height.

Industrial Applicability

The aforementioned machine 100 corresponds to the milling machine that is capable to operate in two modes. In the first mode, the machine 100 performs the milling operation on the ground surface. In such a mode, the machine 100 present the user interface 400 to the operator. As discussed, the operator may provide input on the user interface to adjust the height of the rotor 108. The user interface provides assistance pertaining to a range of height in which the rotor 108 needs to operate. The user interface identifies such ranges by means of graphical scheme. This allows the operator to easily identify the range of height of the plurality of legs 104 and the rotor 108 in which they have to be operated to in turn operate the machine 100 in a particular mode.

When the machine 100 operates in the second mode, the machine 100 is configured to operate commute from one location to another. In such a scenario, the operator of the machine 100 may wish to have a smooth ride. Therefore, an option is presented to the operator on the user interface to either have all the plurality of legs 104 on the same height or have the orientation of the operator cabin 110 at reference orientation (for example zero degrees pitch, yaw, and roll). If the operator chooses the option of adjusting the height of the plurality of legs 104 at the same height, the controller 202 may identify one leg of the plurality of legs 104 based on input received from the operator. Thereafter, the controller 202 may adjust the height of one or more other legs to the height of the identified leg. In such a scenario, the operator cabin 110 may be parallel to the ground surface on which the machine 100 operates.

Additionally, or alternatively, the operator may provide the input to adjust the orientation of the operator cabin 110 at the reference orientation. In such implementation, the height of the plurality of legs 104 is adjusted based on the orientation of the operator cabin 110. In such a scenario, the operator cabin 110 will have zero degree pitch, zero degree yaw, zero degree roll irrespective of the profile of the ground surface.

While aspects of the present disclosure have been particularly shown and described with reference to some embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for operating a milling machine, the method comprising:
    providing, using a controller, a user interface onboard the milling machine, the user interface including:
    one or more icons identifying each of a plurality of legs of the milling machine,
    a first graphical element, associated with each of the one or more icons, wherein the first graphical element identifies a range of a height between a minimum vertical position and a maximum vertical position, associated with each leg of the plurality of legs,
    wherein the first graphical element has a first portion and a second portion, where the first portion representing the milling machine performing a milling operation and the second portion representing the milling machine performing a non-milling operation;
    a second graphical element on the first graphical element, wherein a position of the second graphical element on the first graphical element identifies a current height of the plurality of legs,
    an icon identifying a rotor associated with the milling machine,
    a third graphical element, associated with the icon, identifying a range of a height between a minimum height position and a maximum height position of the rotor with respect to a surface on which the milling machine operates, and
    a fourth graphical element on the third graphical element, wherein a position of the fourth graphical element on the third graphical element identifies a current height position of the rotor; and
    displaying, using the controller, the user interface on a display device onboard the milling machine.

2. The method of claim 1,
    wherein the first portion identifies a first range of height and the second portion identifies a second range of height,
    wherein the first range of height is identified by a first graphical scheme and corresponds to a range of height of the plurality of legs where the milling machine performs the milling operation, and
    wherein the second range of height is identified in a second graphical scheme and corresponds to a range of height of the plurality of legs where the milling machine performs the non-milling operation.

3. The method of claim 1,
    wherein the third graphical element has a first portion and a second portion,
    wherein the first portion of the third graphical element identifies a first range of height of the rotor,
    wherein the second portion of the third graphical element identifies a second range of height of the rotor,
    wherein the first range of height of the rotor is identified by a first graphical scheme and corresponds to a range of height of the rotor where the milling machine performs the milling operation, and
    wherein the second range of height of the rotor is identified by a second graphical scheme and corresponds to a range of height of the rotor where the milling machine performs the non-milling operation.

4. The method of claim 1, wherein each said second graphical element is movable along the first graphical element to change the current height of the leg.

5. The method of claim 1, wherein the fourth graphical element is movable along the third graphical element to change the current height position of the rotor.

6. The method of claim 1, further comprising:
    receiving, at the user interface, an input to one or more of the second graphical elements; and
    adjusting the current height of the leg for each said one or more second graphical elements in correspondence with the input to the one or more second graphical elements.

7. The method of claim 1, further comprising:
    receiving, at the user interface, an input to the fourth graphical element; and
    adjusting the current height of the rotor in correspondence with the input to the fourth graphical element.

8. A control system for operating a milling machine, the control system comprising:
    a controller; and
    a display,
    wherein the controller is configured to generate a user interface and control display of the user interface on the display,
    wherein the user interface includes:
    one or more icons identifying each of a plurality of legs of the milling machine,
    a first graphical element, associated with each of the one or more icons, wherein the first graphical element identifies a range of a height between a minimum vertical position and a maximum vertical position, associated with each leg of the plurality of legs, a second graphical element on the first graphical element, wherein a position of the second graphical element on the first graphical element identifies a current height of the plurality of legs, an icon identifying a rotor associated with the milling machine, a third graphical element, associated with the icon, identifying a range of a height between a minimum height position and a maximum height position of the rotor with respect to a surface on which the milling machine operates, wherein the third graphical element has a first portion and a second portion, where the first portion representing the milling machine performing a milling operation and the second portion representing the milling machine performing a non-milling operation and a fourth graphical element on the third graphical element, wherein a position of the fourth graphical element on the third graphical element identifies a current height position of the rotor.

9. The control system of claim 8,
wherein the first graphical element has a first portion and a second portion,
wherein the first portion identifies a first range of height and the second portion identifies a second range of height,
wherein the first range of height is identified by a first graphical scheme and corresponds to a range of height of the plurality of legs where the milling machine performs the milling operation, and
wherein the second range of height is identified in a second graphical scheme and corresponds to a range of height of the plurality of legs where the milling machine performs the non-milling operation.

10. The control system of claim 8,
wherein the first portion of the third graphical element identifies a first range of height of the rotor,
wherein the second portion of the third graphical element identifies a second range of height of the rotor,
wherein the first range of height of the rotor is identified by a first graphical scheme and corresponds to a range of height of the rotor where the milling machine performs the milling operation, and
wherein the second range of height of the rotor is identified by a second graphical scheme and corresponds to a range of height of the rotor where the milling machine performs the non-milling operation.

11. The control system of claim 8, wherein each said second graphical element is movable along the first graphical element to change the current height of the leg.

12. The control system of claim 8, wherein the fourth graphical element is movable along the third graphical element to change the current height position of the rotor.

13. The control system of claim 8,
wherein the user interface is configured to receive an input to one or more of the second graphical elements, and
wherein the controller is configured to adjust the current height of the leg for each said one or more second graphical elements in correspondence with the input to the one or more second graphical elements.

14. The control system of claim 8,
wherein the user interface is configured to receive an input to the fourth graphical element, and
wherein the controller is configured to adjust the current height of the rotor in correspondence with the input to the fourth graphical element.

15. A non-transitory computer-readable storage medium storing computer-readable instructions that, when executed by a computer, cause the computer to perform a method comprising:
providing a user interface, the user interface including:
one or more icons identifying each of a plurality of legs of the milling machine,
a first graphical element, associated with each of the one or more icons, wherein the first graphical element identifies a range of a height between a minimum vertical position and a maximum vertical position, associated with each leg of the plurality of legs,
wherein the first graphical element has a first portion and a second portion,
wherein the first portion identifies a first range of height and the second portion identifies a second range of height,
wherein the first range of height is identified by a first graphical scheme and corresponds to a range of height of the plurality of legs where the milling machine performs a milling operation,
wherein the second range of height is identified in a second graphical scheme and corresponds to a range of height of the plurality of legs where the milling machine performs a non-milling operation, and
wherein each said second graphical element is movable along the first graphical element to change the current height of the leg;
a second graphical element on the first graphical element, wherein a position of the second graphical element on the first graphical element identifies a current height of the plurality of legs,
an icon identifying a rotor associated with the milling machine,
a third graphical element, associated with the icon, identifying a range of a height between a minimum height position and a maximum height position of the rotor with respect to a surface on which the milling machine operates, and
a fourth graphical element on the third graphical element, wherein a position of the fourth graphical element on the third graphical element identifies a current height position of the rotor; and
displaying the user interface on a display device.

16. The method of claim 15,
wherein the third graphical element has a first portion and a second portion,
wherein the first portion of the third graphical element identifies a first range of height of the rotor,
wherein the second portion of the third graphical element identifies a second range of height of the rotor,
wherein the first range of height of the rotor is identified by a first graphical scheme and corresponds to a range of height of the rotor where the milling machine performs the milling operation,
wherein the second range of height of the rotor is identified by a second graphical scheme and corresponds to a range of height of the rotor where the milling machine performs the non-milling operation, and
wherein the fourth graphical element is movable along the third graphical element to change the current height position of the rotor.

17. The method of claim 15, further comprising:
enabling receipt of, at the user interface, an input to one or more of the second graphical elements; and
outputting a control signal to adjust the current height of the leg for each said one or more second graphical elements in correspondence with the input to the one or more second graphical elements.

18. The method of claim 15, further comprising:

enabling receipt of, at the user interface, an input to the fourth graphical element; and outputting a control signal to adjust the current height of the rotor in correspondence with the input to the fourth graphical element.

* * * * *